86.  AU 112  EX
08-72    XR    3,640,511

United States Patent
Dils, Jr.

[15] 3,640,511
[45] Feb. 8, 1972

[54] METHOD AND APPARATUS FOR MAKING AND PLACING LIGHTWEIGHT CONCRETE

[72] Inventor: Curtis C. Dils, Jr., 5033 119th St. S.E., Bellevue, Wash. 98006

[22] Filed: Oct. 12, 1970

[21] Appl. No.: 79,927

[52] U.S. Cl. ...................259/148, 106/86, 106/97, 117/54, 259/60, 259/152, 259/153
[51] Int. Cl. .........................B28c 5/06, C04b 7/00
[58] Field of Search ..............259/146, 147, 148, 149, 152, 259/154, 60; 106/86, 97; 117/54, 100 S

[56] References Cited

UNITED STATES PATENTS

| Re26,545 | 3/1969 | Albert | 259/147 |
| 2,727,829 | 12/1955 | Chertkof | 117/100 S X |
| 3,516,847 | 6/1970 | Schuster et al. | 117/54 X |

Primary Examiner—William I. Price
Assistant Examiner—Philip R. Coe
Attorney—Graybeal, Cole & Barnard

[57] ABSTRACT

Immersing a lightweight porous aggregate for concrete in hot water in a container; then pumping cold water into the lower part of the container to displace the hot water so as to immerse the aggregate in cold water without exposure to the atmosphere, thus saturating the aggregate with water. Then removing the aggregate from the cold water and mixing it with cement, sand and water to make concrete, which is then pumped under pressure to a location for placement. An improvement being to provide two aggregate containers, and as the hot water is being displaced from the first container by the rising cold water, directing this hot water into the second container which contains aggregate and then back to the first container for another aggregate batch, thus conserving the hot water. A second embodiment being to immerse the aggregate in a steam atmosphere and then immersing it in cold water to saturate the aggregate which can then be mixed to make concrete and pumped under pressure.

21 Claims, 6 Drawing Figures

PATENTED FEB 8 1972　　3,640,511
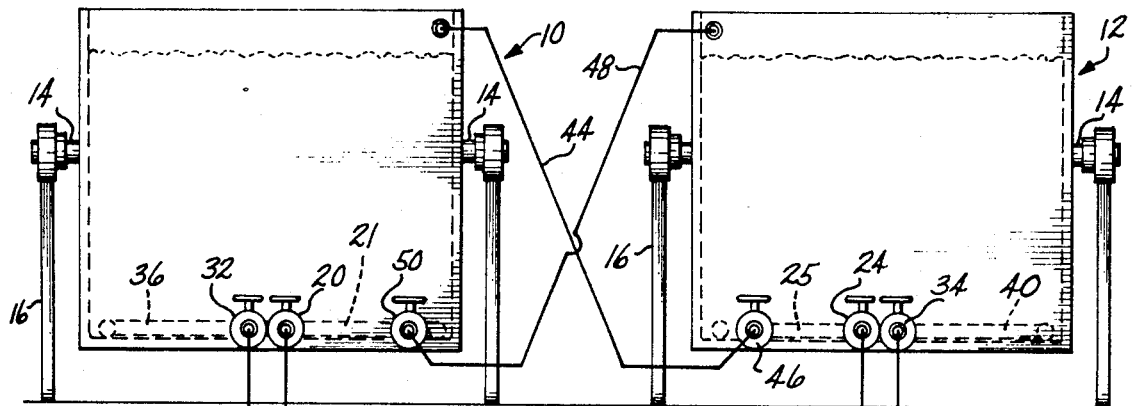
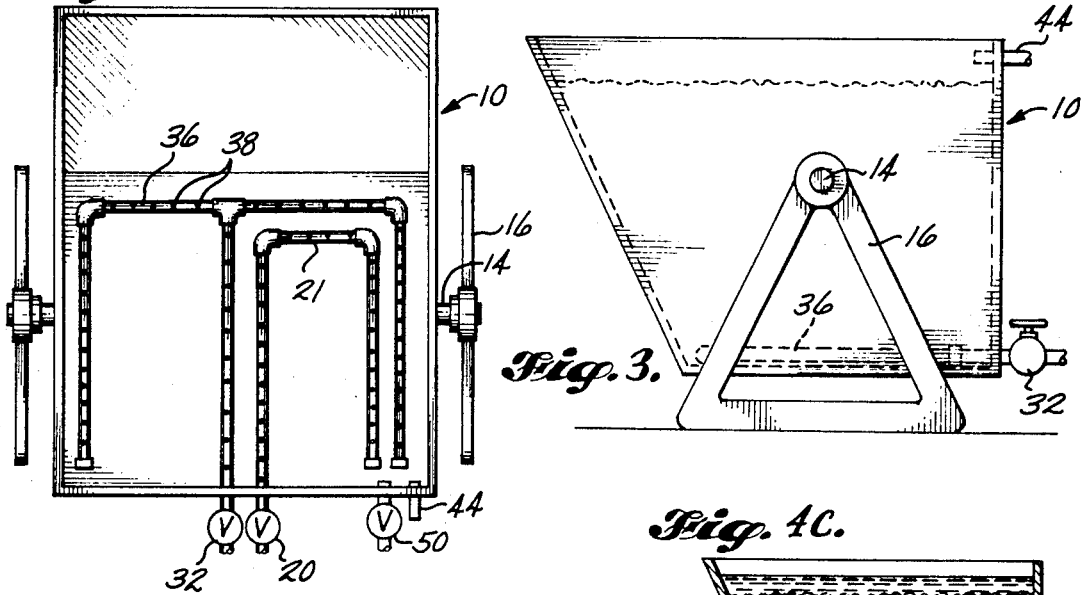
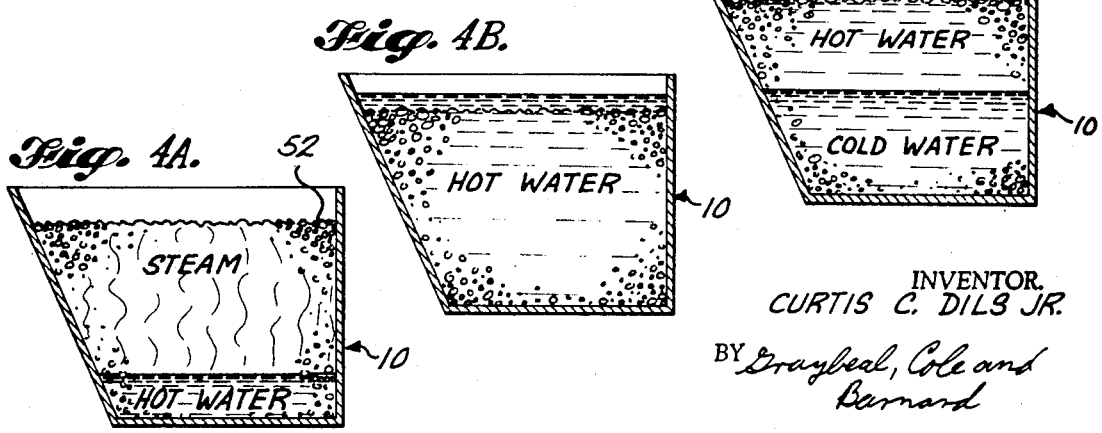
INVENTOR.
CURTIS C. DILS JR.
BY Graybeal, Cole and Barnard
ATTORNEYS 3,640,511

METHOD AND APPARATUS FOR MAKING AND PLACING LIGHTWEIGHT CONCRETE

BACKGROUND OF THE INVENTION

1. Field of the Invention

The invention relates to making lightweight concrete (i.e., concrete in which the coarse aggregate is a lightweight porous material) in which the aggregate is substantially saturated with water, whereby when the concrete is pumped (e.g. from ground level to an upper building floor) water in the concrete mix does not become absorbed into the aggregate portion of the concrete mix.

2. Description of the Prior Art

Lightweight concrete (i.e., concrete which utilizes for its coarse aggregate a porous lightweight material, such as expanded shale) has been in use for a number of years. One of the problems associated with such concrete is that when it is to be pumped from a lower elevation to a higher elevation (for example, from ground level to an upper story of a building being constructed) the concrete is subjected to pumping pressures of perhaps 100 pounds per square inch or more. This causes water in the concrete mix to enter into the pores in the aggregate and thus reduces the moisture content in the cement portion of the concrete mix. Thus, the concrete mix becomes stiff and extremely difficult to pump. Also, when pressure is reduced, the water bleeds back out of the aggregate but is not properly mixed with the cement. This results in inferior concrete.

The most relevant prior art known to the applicant is that contained in U.S. Pat. No. Re. 26, 545, which reissued Mar. 11, 1969 to Robert J. Albert. In this patent there is described a method of pumping concrete in which a porous lightweight aggregate is subjected to a vacuum to evacuate the interior voids of the aggregate. Then water is mixed with the aggregate while maintaining the vacuum. Next, the mixture of water and aggregate is subjected to pressure above atmospheric pressure to fill the evacuated voids with water, and thereafter there is a combining and mixing of the aggregate with sand, cement and water to provide a concrete which can be pumped under pressure.

One of the main problems with the method described in the Albert patent is that it requires depressurizing and pressurizing equipment, and such equipment is not only expensive, but is not readily adaptable for field use in the construction industry.

SUMMARY OF THE INVENTION

In the present invention a porous aggregate is immersed in hot water (preferably water heated to above boiling under pressure) for a period of time, and then without substantial exposure of the aggregate to surrounding atmosphere the aggregate is immersed in cold water, which causes the aggregate to become saturated with water. This is accomplished in the preferred embodiment by directing cold water into the lower portion of the aggregate container to displace the hot water upwardly so that the aggregate then becomes entirely immersed in cold water. In the preferred form of this embodiment, the hot water being displaced is directed into a second batch of aggregate which is then processed in a similar manner to the first batch. A third batch of aggregate can then be placed in the first container and the overflow hot water from the second container directed back to this third batch to begin its processing.

A second embodiment is to immerse the aggregate in steam and then in cold water to saturate the aggregate with water.

Subsequent to the water saturation of an aggregate batch by either of these two embodiments as described above, the saturated aggregate is mixed with sand, cement and mixing water to form concrete which is then pumped under pressure to a location for placement. When this concrete is pumped, the water in the concrete mix does not enter into the aggregate. Thus, the concrete can readily be pumped and there is no degradation of the concrete.

DESCRIPTION OF THE DRAWING

FIG. 1 is a rear elevational view of the apparatus of the present invention;
FIG. 2 is a top view thereof;
FIG. 3 is a side elevational view thereof;
FIG. 4A, 4B, and 4C are semischematic drawings showing the processing sequence of the first embodiment of the present invention.

DESCRIPTION OF THE PREFERRED EMBODIMENT

The apparatus utilized in the first embodiment of the present invention comprises a pair of containers 10 and 12, which for convenience are placed side by side. Each of the containers 10 and 12 is open at the top, and each is mounted by trunnions 14 to a respective mounting frame 16.

There is a cold water pipe 18 leading into the lower rear end of the container 10 and this line 18 has an associated shutoff valve 20 and a discharge pipe 21 in the bottom of the container 10. A similar cold waterline 22, shutoff valve 24 and discharge pipe 25 are provided for the second container 12. A pressurized water boiler 26 is located rearwardly of the containers 10 and 12, and there are two hot waterlines 28 and 30 leading from the boiler 26 to, respectively, the containers 10 and 12. Each line 28 and 30 has an associated shutoff valve 32 and 34, respectively.

The hot waterline 28 enters into the lower rear end of the container 10, and terminates in a U-shaped discharge pipe 36 located in the bottom portion of the container 10 and having a plurality of discharge holes 38. The other hot waterline 30 enters into the tank 12 in a similar manner and terminates in a similar discharge pipe 40 disposed similarly in the tank 12.

A first transfer line 44 with shutoff valve 46 leads from the upper part of a sidewall of the container 10 to the lower part of a sidewall of the container 12. Similarly a second transfer line 48 with associated shutoff valve 50 leads from the upper part of a sidewall of the container 12 to the lower part of the sidewall of the container 10.

To practice the process of the present invention, the two containers 10 and 12 are each loaded with a batch of porous, lightweight aggregate indicated at 52 in FIGS. 4A, B and C. The water boiler 26 is charged with an adequate supply of water and this water is brought to at least about 175° to 200° F. and desirably to about 300° F. (in which case the water will be under pressure in the boiler 26). The valve 32 is opened, and the 300° F. water exits through the holes 38 in the exit pipe 36. The immediate effect is that hot steam flashes from the water as it is discharged through the holes 38 and passes up through the aggregate 52 (as shown in FIG. 4A). As discharge of the hot water continues, the hot water rises in the container 10 until the aggregate 52 is completely immersed in hot water (as shown in FIG. 4B) and the valve 32 is then closed. The aggregate is then permitted to soak in this water, which is at or very nearly at 212° F., for a suitable time (e.g., 5 to 10 minutes). The precise time for adequate soaking will depend upon such factors as the size of the aggregate particles, the amount of aggregate, the degree of porosity, the size of the pour passageways, etc. For conventional lightweight porous aggregate such as expanded shale, a soak time from 5 to 10 minutes has been found to be sufficient.

After the soak period, the cold water valve 20 is opened to permit cold water to enter the container 10, and the transfer valve 46 is opened. This cold water can be water from a conventional cold water source and would be no greater than about 100° F. and in most instances at a lower temperature, such as 50° to 80° F. As the cold water enters the container 10, because of the greater density of the cold water, the hot and cold water will stratify, with the hot water forming an upper layer (as shown in FIG. 4C). Thus, the hot water will flow through the transfer line 44 into the second container 12 which holds a second batch of aggregate.

As the cold water continues to rise in the container 10, eventually the aggregate 52 will become immersed entirely in the cold water. The aggregate 52 is then permitted to soak in the cold water for about 3 to 10 minutes (again the soaking time depending upon the particular character and amount of the aggregate) until the aggregate has cooled. During this soak in the cold water, the saturation of the aggregate becomes substantially complete. Then the saturated aggregate is removed from the container 10, this being accomplished in the most convenient manner simply by rotating the container 10 on its trunnion mounts 14 so as to dump the aggregate 52 and the water out.

This saturated aggregate when exposed to the surrounding atmosphere, will tend to slowly lose its absorbed water. Thus, it should be either kept in a moist environment or soon after being removed from the cold water be combined with other ingredients to make concrete. The saturated aggregate of the present invention is utilized to make concrete in a conventional manner. That is, it is mixed with sand, cement and water to form a concrete mix. This concrete mix can then be pumped at high pressures (e.g., well in excess of 100 p.s.i.) and the water contained in the cement portion of the concrete mix will not tend to enter into the already water saturated aggregate particles in the concrete mix. When the concrete is in place and is curing, the water in the saturated aggregate will gradually pass out of the aggregate particles, and after the concrete has completed the curing process, the water content of the aggregate particles will have been reduced to the extent that the density of the concrete is substantially the same as that of lightweight concrete made by conventional means (i.e., where there is no water saturation of the aggregate particles).

When the cold water is initially introduced into the container 10 and the hot water leaves the container 10 and passes through the transfer line 44 into the container 12, the hot water valve 34 is opened to permit hot water and steam to enter through the line 30 and out the exit pipe 40 into the second container 12. As in the processing steps described previously with respect to the tank 10, steam from the exit pipe 40 passes up through the second batch of aggregate in the container 12 and subsequently hot water (heated to or nearly to the boiling point by the addition of the water and steam exiting from the exit pipe 40) completely immerses the aggregate in the container 12.

After a suitable soak time of the second batch of aggregate, cold water is directed into the container 12 through the line 22, and the transfer valve 50 is opened to permit hot water from the tank 12 to pass through the transfer line 48 back into the container 10. Prior to this, the first batch of aggregate had been removed from the container 10 and a third batch of aggregate had been loaded into the container 10 for processing. Thus it can be seen that a conservation of the hot water is achieved by this transfer mechanism, and by augmenting the water with that from the boiler the hot water is kept at boiling point.

It has been found that the saturation of the aggregate is enhanced by using a wetting agent in the cold water.

In a second embodiment of the present invention, the porous aggregate is placed in a container, steam is passed through the aggregate and a cover with a restricted outlet is placed over the container to contain the steam. Steam is continued to be introduced until the interior of the container is saturated with steam so as to displace substantially all the atmosphere (air) inside the container. This can be accomplished either by passing steam into the container (e.g., through a pipe) or by placing water in the bottom of the container and heating the water to cause the water to boil. As steam continues to be introduced into the container, initially air and steam will pass out through the outlet in the cover and after a suitable period the interior of the container will substantially be devoid of air and saturated with steam. The action of the steam on the aggregate will be enhanced if it is pressurized in the container. After the aggregate has thus been in contact with the steam for a suitable time (e.g., 5 to 10 minutes), cold water is introduced into the container to immerse the aggregate in cold water. This should be done in a manner to allow no substantial contact of the aggregate with air (e.g., by closing the cover outlet as the cold water is introduced). After the aggregate has soaked in the cold water for a suitable time (e.g., 3 to 10 minutes), the aggregate is mixed to make concrete and pumped as described above.

EXPERIMENT NO. 1

To demonstrate the degree of saturation achieved by merely soaking aggregate in cold water, a sample of expanded shale aggregate, Eternalite brand, from Eternal Island, British Columbia, Canada was oven dried to remove substantially all moisture. Fifty grams of this oven dried aggregate was totally immersed in water at about 60° F. for a 24-hour period. The 50-gram sample was then removed from the water, permitted to drain, and then weighed. The wet weight was 55 grams, which was an approximate 10 percent increase by weight of water. A substantial portion of the 5 grams of moisture is believed to be surface moisture. Further soaking of this aggregate for another 24-hour period did not produce any further increase in weight. Nine additional tests were made with a 24-hour saturation period in 60° F. water. The weight of the wetted aggregate varied from 8½ to 13 percent over the dry aggregate.

EXPERIMENT NO. 2

A 50-gram sample of the same type aggregate used in Experiment No. 1 was immersed in water and then heated to cause the water to boil. The boiling of the water with the aggregate immersed in the water was continued for 5 minutes, at which time it is believed that the aggregate particles were brought up to the temperature of the boiling water. The container with the boiling water and the aggregate was then removed from the heater, and cold water was run through a hose into the container for approximately a minute until substantially all the hot water was displaced with the cold water (which was at about 60° F.). The aggregate was permitted to soak in the cold water for about 3 minutes. Then the aggregate was removed and rolled in paper towels until the surface was substantially dry. The aggregate was then weighed and was found to be 65 grams, which indicated an increase of absorbed water of 30 percent by weight. This experiment was conducted 40 times with other 50-gram samples of similar aggregate. The increase in weight due to water absorption varied between 17 percent to 38 percent.

EXPERIMENT NO. 3

The process of the present invention was practiced on an actual building site as in the description of the preferred form of the first embodiment disclosed in the specification herein. The saturated aggregate that resulted was then mixed with sand, cement and water to make concrete which was pumped from ground level through a pipe to the sixth floor of a building under construction. The concrete was pumped with no difficulty. The concrete suffered no degradation, and it was placed in location to form a satisfactory concrete slab comparable in quality to one made of conventional lightweight concrete that had not been pumped.

EXPERIMENT NO. 4

A 50-gram sample of the same type of dried aggregate used in Experiment 1 was placed in a netlike fabric and then placed in a container on top of some rock which had been placed in the lower half of the container to act as support. Water was placed in the lower quarter of the container and heat was applied to the container. After about 6 minutes, steam began passing vigorously up through the 50-gram sample from the boiling water in the container. This vigorous boiling was continued for about 4 minutes. Then a stopper with a restricted opening was placed in the open top of the container and a thermometer was placed loosely in the stopper opening in a manner to permit steam to pass through the stopper opening. The temperature inside the container rose to 225° F. as there was a continued but more moderate application of heat and steam passed out the stopper opening. Three minutes after the stopper was applied, and after the steam in the container had reached 225° F., the aggregate sample was immersed in cold water by running cold water into the container through a hose. The aggregate sample remained immersed in the cold water for 3 minutes and then was removed from the container. The aggregate sample was rolled in paper towels to remove surface moisture. It then was weighed and was found to be 67 grams, which was a 34 percent increase in weight.

EXPERIMENT NO. 5

The same process was performed as in Experiment No. 4 with another 50-gram sample, except that the temperature in the container was raised to 250° F. The saturated aggregate at the completion of the process was found to be 67 grams for a 34 percent increase in weight. The identical experiment was repeated with another sample, and the weight of the saturated aggregate was found to be 70 grams for a 40 percent increase in weight.

While all the physical phenomena which occur in the process of the present invention are probably not completely understood, the following can be hypothexiaed with reasonable justification. When the aggregate is placed in boiling water or in a steam atmosphere, it is believed that two related phenomena occur. First, the air molecules become subject to greater agitation, and secondly, the vapor pressure of the water or steam increases to equal atmospheric pressure or rise above atmospheric pressure if the water or steam temperature is above 212° F. Thus, the water vapor or steam probably displaces a substantial portion of the air or other gases present in the pores of the aggregate. As the aggregate is cooled in the presence of water, the vapor pressure of the water greatly diminishes to create a pressure differential between the interior of the aggregate particles and the ambient pressure. Thus, the saturation of the aggregate with liquid water proceeds substantially to completion.

However, regardless of the correctness of the above hypothesis, it has been found that the process of the present invention does actually saturate the porous aggregate and that this aggregate can be used to make lightweight concrete which can be effectively pumped under pressure without degradation of the concrete.

What is claimed is:
1. A method of making lightweight concrete capable of being pumped at high pressures without degradation of the concrete, said concrete comprising porous lightweight aggregate particles, said method comprising:
   a. causing liquid absorption of said aggregate particles by:
      1. contacting said aggregate particles with liquid at an elevated temperature, and
      2. contacting said aggregate particles with liquid at a lower temperature to complete liquid adsorption of the aggregate particles, and
   b. mixing said liquid absorbed aggregate particles with cement, sand and water to make concrete.

2. The method as recited in claim 1, wherein after said aggregate particles are contacted with liquid at an elevated temperature, there is no substantial contact of said particles with surrounding atmosphere prior to said aggregate particles being contacted with liquid at a lower temperature.

3. The method as recited in claim 1, wherein said liquid is water.

4. The method as recited in claim 3, wherein said elevated temperature is at least 175° F.

5. The method as recited in claim 3, wherein said elevated temperature is at least about 200° F.

6. The method as recited in claim 3, wherein said aggregate particles are contacted with water at its approximate boiling point at atmospheric pressure.

7. The method as recited in claim 6, wherein the water at a lower temperature is below about 100° F.

8. The method as recited in claim 3, wherein steam is passed through said aggregate particles prior to the aggregate particles being contacted with water at an elevated temperature.

9. The method as recited in claim 3, wherein said aggregate particles are contacted with water at an elevated temperature for a time period of at least about 5 minutes.

10. The method as recited in claim 3, wherein said aggregate particles are contacted with water at a lower temperature for a time period of at least about 3 minutes.

11. A batch process for making lightweight concrete capable of being pumped at high pressures without degradation of the concrete, said concrete comprising porous lightweight aggregate particles, said method comprising:
   a. immersing a batch of said aggregate in hot water in a container having a bottom portion and a top portion,
   b. inserting cold water into the bottom portion of the container so that the cold water rises in the container to displace the hot water surrounding the aggregate particles upwardly and said aggregate particles become immersed in cold water, and
   c. then mixing said water saturated aggregate with cement, sand and water to make concrete.

12. The process as recited in claim 11, wherein said concrete is then pumped under pressure.

13. The process as recited in claim 11, wherein the hot water prior to being inserted into the container is heated under pressure to a temperature higher than about 212° F. and the hot water is inserted into the lower portion of the container whereby steam from the hot water rises through the aggregate particles.

14. A dual batch process for making water-saturated lightweight aggregate, comprising:
   a. immersing a first batch of aggregate particles in hot water in a container having a bottom portion and a top portion,
   b. inserting cold water into the bottom portion of the container so that the cold water rises in the container to displace the hot water surrounding the aggregate particles upwardly and said aggregate particles become immersed in cold water,
   c. directing the hot water being displaced from the top portion of the first container into a second container and thus immersing a second batch of aggregate particles in the hot water in the second container, and
   d. inserting cold water into the bottom portion of the second container so that the cold water rises in the second container to displace the hot water surrounding the second batch of aggregate particles upwardly and said second batch becomes immersed in cold water.

15. The process as recited in claim 14 comprising the further step of directing the hot water from the upper portion of the second tank to a third batch of aggregate particles to be water saturated.

16. The process as recited in claim 14, wherein hot water heated under pressure to a temperature higher than 212° F. is inserted into hot water in said second container so as to maintain the hot water in the second container at an adequately high temperature.

17. A process for making water saturated lightweight aggregate for concrete, comprising:
   a. immersing aggregate in $H_2O$ at an elevated temperature to displace gaseous substances entrained in said aggregate with gaseous $H_2O$, and
   b. Without substantial exposure of said aggregate to surrounding atmosphere, immersing said aggregate in cold water to cause substantial water saturation of the aggregate.

18. The process as recited in claim 17, wherein said $H_2O$ at an elevated temperature is steam.

19. The process as recited in claim 17, wherein said $H_2O$ at an elevated temperature is water whose temperature is at least at the approximate boiling point of water.

20. A lightweight water saturated aggregate for concrete made according to the process recited in claim 17.

21. An apparatus adapted for a dual batch process of making water saturated lightweight aggregate, said apparatus comprising:
a. a first and second aggregate container, each of said containers having an upper portion and a lower portion,
b. a first conduit leading from the upper portion of the first container to the lower portion of the second container whereby water displaced from the first container flows into the lower portion of the second container,
c. a second conduit leading from the upper portion of the second container to the lower portion of the first container, whereby water displaced from the second container flows into the lower portion of the first container,
d. means to unload each of said containers,
e. means to direct selectively hot and cold water into the bottom portions of each of said containers.

* * * * *